US012695526B2

(12) United States Patent
Choi et al.

(10) Patent No.: US 12,695,526 B2
(45) Date of Patent: Jul. 28, 2026

(54) ELECTRONIC DEVICE FOR PREDICTING CHANNEL IN MIMO COMMUNICATION SYSTEM AND METHOD OF PREDICTING THE SAME

(71) Applicant: Samsung Electronics Co., Ltd., Suwon-si (KR)

(72) Inventors: Junil Choi, Daejeon (KR); Beomsoo Ko, Daejeon (KR); Hwanjin Kim, Daejeon (KR)

(73) Assignees: Samsung Electronics Co., Ltd., Gyeonggi-do (KR); Korea Advanced Institute of Science and Technology, Deajeon (KR)

( * ) Notice: Subject to any disclaimer, the term of this patent is extended or adjusted under 35 U.S.C. 154(b) by 437 days.

(21) Appl. No.: 18/316,028

(22) Filed: May 11, 2023

(65) Prior Publication Data
US 2024/0048257 A1 Feb. 8, 2024

(30) Foreign Application Priority Data
Aug. 2, 2022 (KR) ......................... 10-2022-0096359

(51) Int. Cl.
| | |
|---|---|
| *H04B 17/391* | (2015.01) |
| *H04B 7/0413* | (2017.01) |
| *H04B 17/309* | (2015.01) |

(52) U.S. Cl.
CPC ....... *H04B 17/3913* (2015.01); *H04B 17/309* (2015.01); *H04B 7/0413* (2013.01)

(58) Field of Classification Search
CPC .............. H04B 17/3913; H04B 17/309; H04B 7/0413; H04B 17/373; H04L 25/024; H04L 25/0204; H04L 25/0224; H04L 5/0048; H04L 41/16; H04L 5/005; H04L 25/0202; H04L 25/0222; H04L 5/0051; H04L 27/2695; H04L 5/1469; H04L 5/0023;

(Continued)

(56) References Cited

U.S. PATENT DOCUMENTS

| | | |
|---|---|---|
| 10,805,120 B2 | 10/2020 | Li et al. |
| 10,892,810 B2 | 1/2021 | Zhan et al. |

(Continued)

FOREIGN PATENT DOCUMENTS

| | | |
|---|---|---|
| CN | 111917446 A | 11/2020 |
| KR | 10-2021-0128841 A | 10/2021 |

OTHER PUBLICATIONS

Dong, P. "Deep CNN for wideband mmwave massive MIMO channel estimation using frequency correlation" *ICASSP*, pp. 4529-4533.

(Continued)

*Primary Examiner* — Lana N Le
(74) *Attorney, Agent, or Firm* — Harness, Dickey & Pierce, P.L.C.

(57) ABSTRACT

An electronic device which includes processing circuitry configured to acquire training data corresponding to multiple antennas, the training data having a label and features, the label including a first channel value for a first time slot, and the features including a plurality of second channel values for a plurality of time slots before the first time slot, train a channel prediction model based on the training data to obtain a trained channel prediction model, and obtain a channel prediction value for a prediction time based on the trained channel prediction model.

17 Claims, 9 Drawing Sheets

(58) Field of Classification Search
CPC ..... H04L 41/14; H04L 25/0254; H04L 47/83;
H04L 25/0242; H04L 41/142; H04W
24/10; H04W 16/22; H04W 72/0446;
H04W 52/223; H04W 40/18; H04W
52/325; H04W 16/18; H04W 24/06;
H04W 28/0942
See application file for complete search history.

(56) References Cited

U.S. PATENT DOCUMENTS

| | | | |
|---|---|---|---|
| 10,903,870 B1 | 1/2021 | Smyth et al. | |
| 2003/0017835 A1* | 1/2003 | Bergel | H04L 25/0224 |
| | | | 455/504 |
| 2014/0119225 A1* | 5/2014 | Hasegawa | H04B 7/0413 |
| 2018/0159602 A1* | 6/2018 | Tsai | H04B 17/373 |
| 2021/0006989 A1* | 1/2021 | Lee | H04W 24/02 |
| 2021/0194733 A1* | 6/2021 | Huangfu | H04B 17/3913 |
| 2021/0256428 A1* | 8/2021 | Düll | G06N 20/10 |
| 2021/0314036 A1 | 10/2021 | Baknina et al. | |
| 2021/0314198 A1 | 10/2021 | Kwon | |
| 2023/0222324 A1* | 7/2023 | Iwata | G06N 3/0464 |
| 2024/0340942 A1* | 10/2024 | Saily | H04W 24/02 |

OTHER PUBLICATIONS

Jiang, W. "Recurrent neural network-based frequency-domain channel prediction for wideband communications" *VTC2019-Spring*, (2019). pp. 1-6.
Kim, H. "Massive MIMO channel prediction: Kalman filtering vs. machine learning" *IEEE Transactions on Communications*, pp. 518-528.
Yuan, J. "Machine learning-based channel estimation in massive MIMO with channel aging" *SPAWC*, pp. 1-5.
Ko, B. "Machine Learning-Based Channel Prediction Exploiting Frequency Correlation in Massive MIMO Wideband Systems" IEEE.

* cited by examiner

FIG. 6

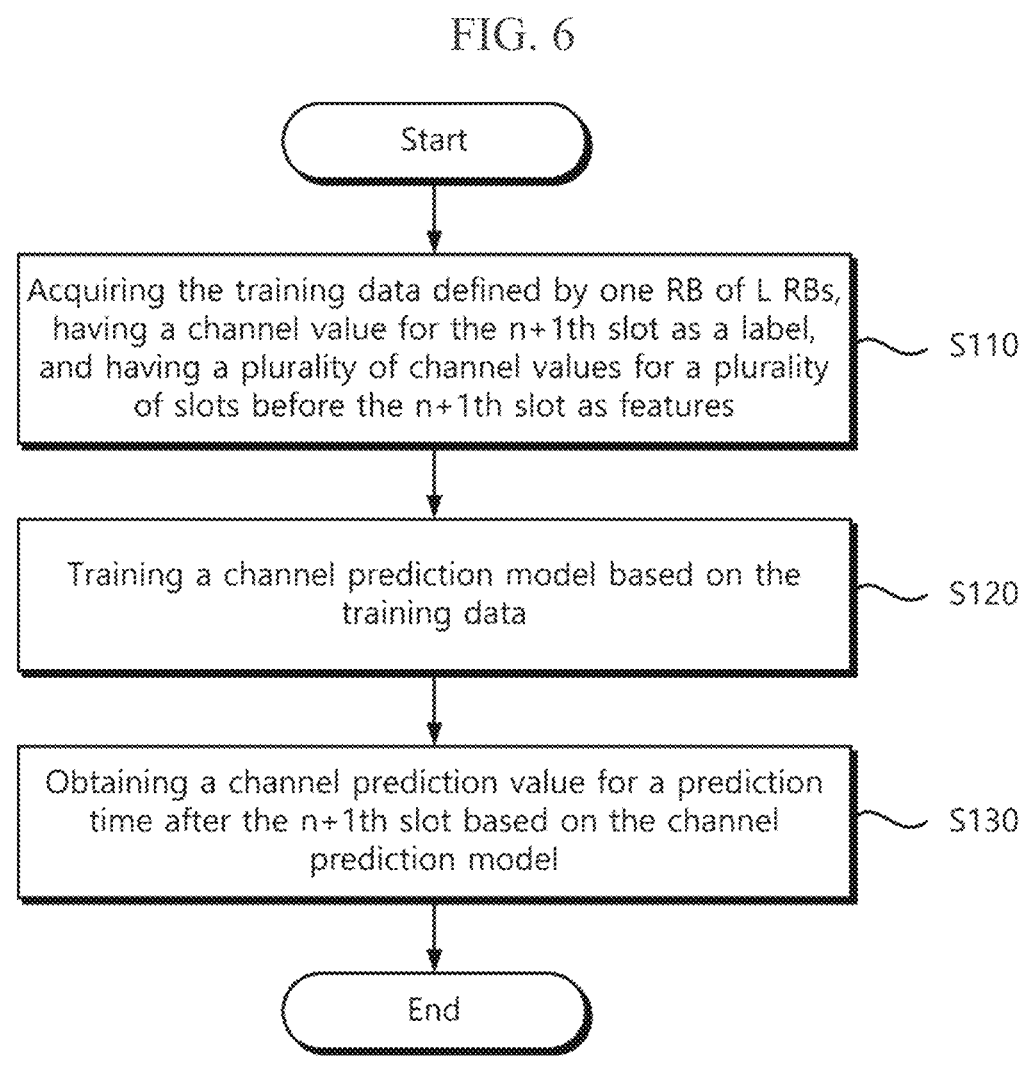

Start

Acquiring the training data defined by one RB of L RBs, having a channel value for the n+1th slot as a label, and having a plurality of channel values for a plurality of slots before the n+1th slot as features — S110

Training a channel prediction model based on the training data — S120

Obtaining a channel prediction value for a prediction time after the n+1th slot based on the channel prediction model — S130

End

ELECTRONIC DEVICE FOR PREDICTING CHANNEL IN MIMO COMMUNICATION SYSTEM AND METHOD OF PREDICTING THE SAME

CROSS-REFERENCE TO RELATED APPLICATIONS

This application claims priority under 35 U.S.C. § 119 to Korean Patent Application No. 10-2022-0096359, filed on Aug. 2, 2022, in the Korean Intellectual Property Office, the disclosures of which are incorporated by reference herein in their entireties.

BACKGROUND

Embodiments of the present disclosure relate to an electronic device for predicting a channel in a MIMO communication system, and a method for predicting the channel.

Multiple-input multiple-output (MIMO) communication systems use channel state information (CSI) to utilize advantages of a large-scale antenna array. The CSI may be out-dated information, and thus, less accurate, due to a feedback delay between a base station (BS) and a user equipment (UE), or rapid mobility of the UE. The out-dated CSI (e.g., the decrease in accuracy of the CSI) lowers the transmission rate of the communication system. An artificial intelligence (AI) technology may be used to provide a more accurate channel prediction without additional channel training resources. However, the conventional AI-based channel prediction technology involves excessive overhead (e.g., excessive time and resources) for learning.

SUMMARY

Embodiments of the present disclosure provide an electronic device for predicting a channel in a MIMO communication system capable of accurately predicting a channel with less overhead, and a method for predicting the channel.

According to embodiments of the present disclosure, an electronic device includes processing circuitry configured to acquire training data corresponding to multiple antennas, the training data having a label and features, the label including a first channel value for a first time slot, and the features including a plurality of second channel values for a plurality of time slots before the first time slot, train a channel prediction model based on the training data to obtain a trained channel prediction model, and obtain a channel prediction value for a prediction time based on the trained channel prediction model.

According to embodiments, the processing circuitry may be configured to estimate a respective channel value for each of a plurality of resource blocks (RBs) based on a pilot signal and an uplink signal, the pilot signal being received on the plurality of RBs through the multiple antennas, and acquire the label and the features from a row vector of a matrix, a column vector of the matrix having the respective channel value for each of the plurality of RBs.

According to embodiments, the respective channel value for each of the plurality of RBs may have a dimension of M×1, M being a number of the multiple antennas, and the label and each of the features may have a dimension of 1×L, L being a number of the plurality of RBs.

According to embodiments, the processing circuitry may be configured to train the channel prediction model to minimize (or reduce) an error between a result value of the channel prediction model and the label.

According to embodiments, the channel prediction model may be based on a Multi-Layer Perceptron (MLP).

According to embodiments, a number of the plurality of time slots may be set based on a moving speed of a user equipment that transmits the uplink signal. According to embodiments, the channel prediction model includes only one model. According to embodiments, the first channel value for the first time slot may be $$q_{n+1}^{\alpha},$$

and the plurality of second channel values may be $$q_{n-n_0+1}^{\alpha}, \cdots, q_n^{\alpha},$$

$\alpha$ being a value from 1 to M, M being a number of the multiple antennas, and n being a natural number. According to embodiments, the processing circuitry may be configured to reduce a time dimension of the training data.

According to embodiments of the present disclosure, a method of predicting a channel includes acquiring training data corresponding to multiple antennas, the training data having a label and features, the label including a first channel value for a first time slot, and the features including a plurality of second channel values for a plurality of time slots before the first time slot, training a channel prediction model based on the training data to obtain a trained channel prediction model, and obtaining a channel prediction value for a prediction time based on the trained channel prediction model.

According to embodiments, the acquiring of the training data may include estimating a respective channel value defined for each of a plurality of resource blocks (RBs) based on a pilot signal and an uplink signal, the pilot signal being received on the plurality of RBs through the multiple antennas, and the uplink signal including the pilot signal, and acquiring the label and the features from a row vector of a matrix, a column vector of the matrix having the respective channel value for each of the plurality of RBs.

According to embodiments, the respective channel value for each of the plurality of RBs may have a dimension of M×1, M being a number of the multiple antennas, and the label and each of the features may have a dimension of 1×L, L being a number of the plurality of RBs.

According to embodiments of the present disclosure, a base station includes a transceiver configured to receive an uplink signal via multiple antennas, the uplink signal including a pilot signal on a plurality of resource blocks (RBs), and processing circuitry connected to the transceiver, the processing circuitry being configured to acquire training data corresponding to the multiple antennas, the training data having a label and features, the label including a first channel value for a first time slot, and the features including a plurality of second channel values for a plurality of time slots before the first time slot, train a channel prediction model based on the training data to obtain a trained channel prediction model, and obtain a channel prediction value for a prediction time based on the trained channel prediction model.

BRIEF DESCRIPTION OF THE FIGURES

A detailed description of each drawing is provided to facilitate a more thorough understanding of the drawings referenced in the detailed description of the present disclosure.

FIG. 6 is a flowchart illustrating a channel prediction method corresponding to the first approach, according to embodiments of the present disclosure.

FIG. 7 is a diagram for describing an operation of a learning unit and a prediction unit corresponding to a second approach, according to embodiments of the present disclosure.

FIG. 9 is a diagram for describing an operation of a learning unit and a prediction unit corresponding to a third approach, according to embodiments of the present disclosure.

DETAILED DESCRIPTION

Hereinafter, embodiments of the present disclosure may be described in detail and clearly to such an extent that one of ordinary skill in the art easily implements the present disclosure.

Hereinafter, with respect to the equations disclosed in the present disclosure, bold letters in lowercase and uppercase letters indicate vectors or matrices. $A^{-1}$, $A^T$, and $A^H$ denote an inverse, a transpose, and a conjugate transpose of a matrix A, respectively. $\mathbb{E}$ [·] denotes an expected value, Re(·) and Im(·) denote a real part and an imaginary part, respectively. $\mathbb{C}^{m \times n}$ represents a complex matrix of m×n, and ‖·‖ represents an L2 norm of a vector. $0_m$ denotes an m×m full zero matrix, and $I_m$ denotes an m×m identity matrix. $\mathcal{CN}$ (m, $\sigma^2$) represents complex Gaussian noise with mean 'm' and variance $\sigma^2$.

Hereinafter, embodiments of the present disclosure may be applied for channel prediction between a base station and a user equipment in a MIMO communication system. The MIMO communication system may include a single cell or multiple cell massive wideband MIMO communication system.

Hereinafter, operations are described from the viewpoint of the base station for convenience, but when channel estimation and channel prediction are performed in a user equipment (UE), and the UE is able to communicate with multiple base stations using MIMO, embodiments of the present disclosure may also be applied to the UE.

In embodiments of the present disclosure, the base station is equipped with M multiple antennas (where 'M' is a natural number) and may transmit and receive a downlink (DL) signal and an uplink (UL) signal on a radio resource area through a channel with k UEs (where, 'k' is a natural number). In the case of a wideband system, orthogonal frequency-division multiplexing (OFDM) may be applied since inter-symbol interference (ISI) may occur when a signal is transmitted on a single carrier. The OFDM scheme may not only solve or reduce the ISI issue of the wideband system, but also converts a wideband single carrier channel into parallel narrowband sub-carrier channels. The channel model is assumed to be block fading.

Figure 1:
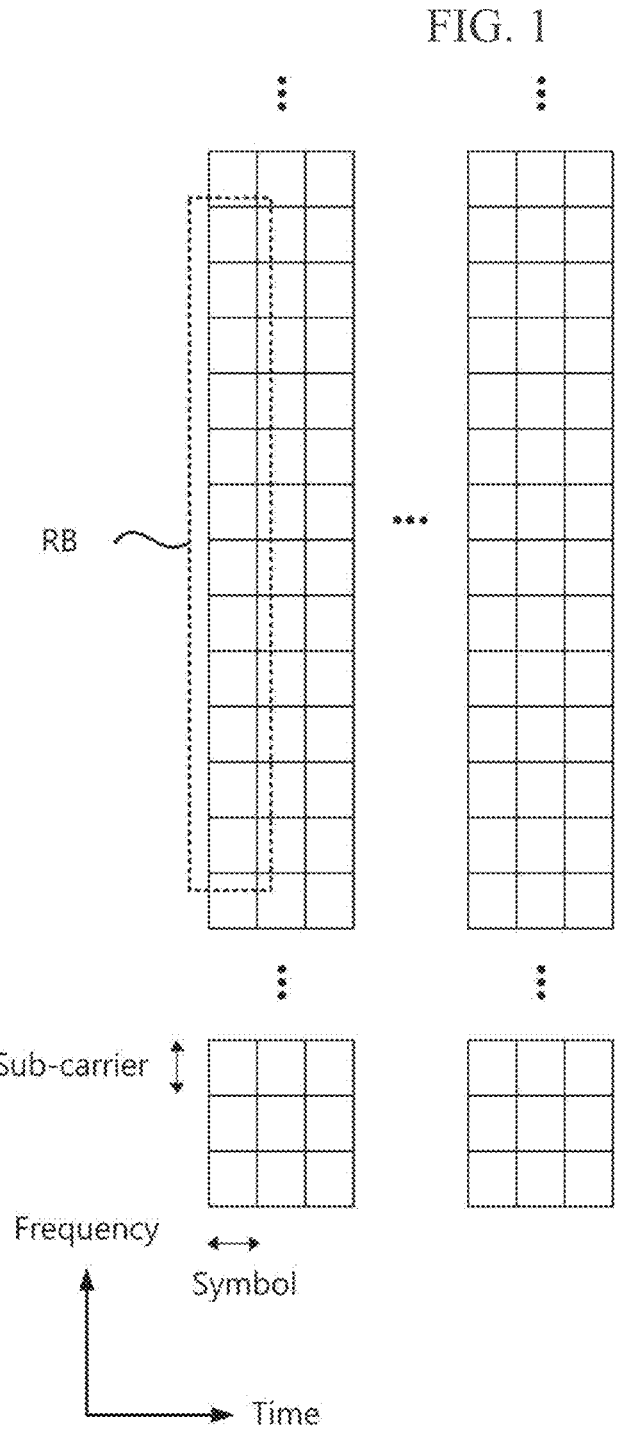
FIG. 1 is a diagram for describing radio resource areas of a 5th generation (5G) system.

FIG. 1 is a diagram for describing radio resource areas of a 5$^{th}$ generation (5G) system.

Referring to FIG. 1, a base station may transmit and/or receive a downlink signal and/or an uplink signal on a radio resource area. The radio resource area is defined on a time domain and a frequency domain, and horizontal and vertical axes may correspond to the time domain and the frequency domain, respectively. The minimum (or smallest) transmission unit in the time domain may be an OFDM symbol, and a plurality of OFDM symbols may be gathered to form one time slot (also referred to as slots herein). The minimum (or smallest) transmission unit in the frequency domain may be a sub-carrier, and 12 sub-carriers may be gathered to form one resource block (RB). The minimum (or smallest) transmission unit in the time domain and the frequency domain may be a resource element (RE).

An uplink reception signal $$y_n^m$$

transmitted through an mth sub-carrier in an nth time slot may be expressed by Equation 1.

$$y_n^m = \sqrt{\rho} \sum_{k=1}^{K} h_{n,k}^m x_{n,k}^m + w_n^m \qquad \text{[Equation 1]}$$

Here, ρ is a signal-to-noise ratio (SNR), $$h_{n,k}^m \in \mathbb{C}^{M \times 1}$$

is an uplink channel of a kth user equipment, $$x_{n,k}^m \in \mathbb{C}$$

is a signal transmitted from the kth user equipment, and $$w_n^m \sim \mathcal{CN}(0, I_m)$$

is the complex Gaussian noise. In the present disclosure, a Spatial Channel Model (SCM) of 3GPP (3rd Generation Partnership Project) is described as an example to perform channel prediction reflecting a realistic channel environment, but embodiments of the present disclosure are not necessarily limited to the SCM.

For convenience, when the number of RBs described above is 'L' (here, 'L' is a natural number), the UE may transmit a pilot signal having a symbol length τ for channel estimation when transmitting the uplink signal. The pilot signal (or a reference signal (RS)) may be transmitted through the uplink or downlink, but in the present disclosure, as described above, from the viewpoint of the base station, the uplink pilot signal will be used as a reference. For example, the pilot signal may include a DeModulation Reference Signal (DMRS) and/or a Sounding Reference Signal (SRS).

The pilot signal according to embodiments may be transmitted through a first sub-carrier channel of each RB, and in this case, a channel of each RB through which the pilot signal is transmitted may be specifically referred to as a sub-channel. A signal received by the base station through a channel $h_n^\ell \in \mathbb{C}^{M \times 1}$ defined as a lth sub-channel (where 'l' is a natural number) of an nth slot in the base station may be expressed by Equation 2.

$$Y_n^\ell = \sqrt{\rho}\, h_n^\ell a_n^{\ell T} + W_n^\ell \qquad \text{[Equation 2]}$$

Here $Y_n^\ell \in \mathbb{C}^{M \times \tau}$ is a signal received by the base station, $a_n^\ell \; a_n^\ell$ is a pilot signal transmitted by the user equipment, and $W_n^\ell \in \mathbb{C}^{M \times 1}$ is additive white Gaussian noise.

The received signal may be vectorized as in Equation 3.

$$\underline{y}_n^\ell = A_n^\ell \, h_n^\ell + \underline{w}_n^\ell \qquad \text{[Equation 3]}$$

Here, $\underline{y}_n^\ell$, $\mathbb{C}^{M\tau \times 1}$ is ve $Y_n^\ell$ ), $A_n^\ell$ $\mathbb{C}^{M\tau \times M}$, $A_n^\ell \in \mathbb{C}^{M\tau \times M}$ is $a_n^\ell \otimes I_M$, and $\underline{w}_n^\ell \in \mathbb{C}^{M\tau \times 1}$ is ve $W_n^\ell$ ).

Least square (LS)-based channel estimation may be performed based on a signal $\underline{y}_n^\ell$ received from the base station and a matrix $A_n^\ell$ of the transmitted pilot signal. $g_n^\ell \in \mathbb{C}^{M\tau \times 1}$, which is a channel estimated by the LS method, may be expressed by Equation 4.

$$g_n^\ell = \left(A_n^{\ell H} A_n^\ell\right)^{-1} A_n^{\ell H} \underline{y}_n^\ell \qquad \text{[Equation 4]}$$

$g_n^\ell$ may also be defined as a column vector of a matrix $G_n \mathbb{C}^{M\tau \times 1}$ expressed by Equation 5. $g_n^\ell$ has a dimension of M×1.

$$G_n = \begin{bmatrix} g_n^1 & \cdots & g_n^L \end{bmatrix} = \begin{bmatrix} g_n^{1,1} & \cdots & g_n^{L,1} \\ \vdots & \ddots & \vdots \\ g_n^{1,M} & \cdots & g_n^{L,M} \end{bmatrix} \qquad \text{[Equation 5]}$$

In the present disclosure, each element of matrix $G_n \in \mathbb{C}^{M \times L}$ may be referred to as a channel value or an estimated channel value. The channel value $g_n^\ell$ in Equation 4 may also be referred to as 'g' for convenience, and 'g' may mean an estimated channel value for any slot and any sub-channel. In this case, since the sub-channel is included in each of the plurality of RBs, it may be understood that 'g' is defined for each of the plurality of RBs.

$G_n$ in Equation 5 may also be referred to as 'G' for convenience, and 'G' may mean an aggregation matrix of channel values estimated for a given slot.

In the sub-channel of each RB through which the above-described pilot signal is transmitted, there is a correlation between channels. For example, an auto-correlation of the lth sub-channel may be defined by Equation 6.

$$R_{\ell,\ell}(m) = \mathbb{E}\left[h_n^{\ell H} h_{n+m}^\ell\right] \qquad \text{[Equation 6]}$$

A cross-correlation between the lth sub-channel and the l+1th sub-channel may be defined by Equation 7.

$$R_{\ell,\ell+1}(m) = \mathbb{E}\left[h_n^{\ell H} h_{n+m}^{\ell+1}\right] \qquad \text{[Equation 7]}$$

Figure 2:
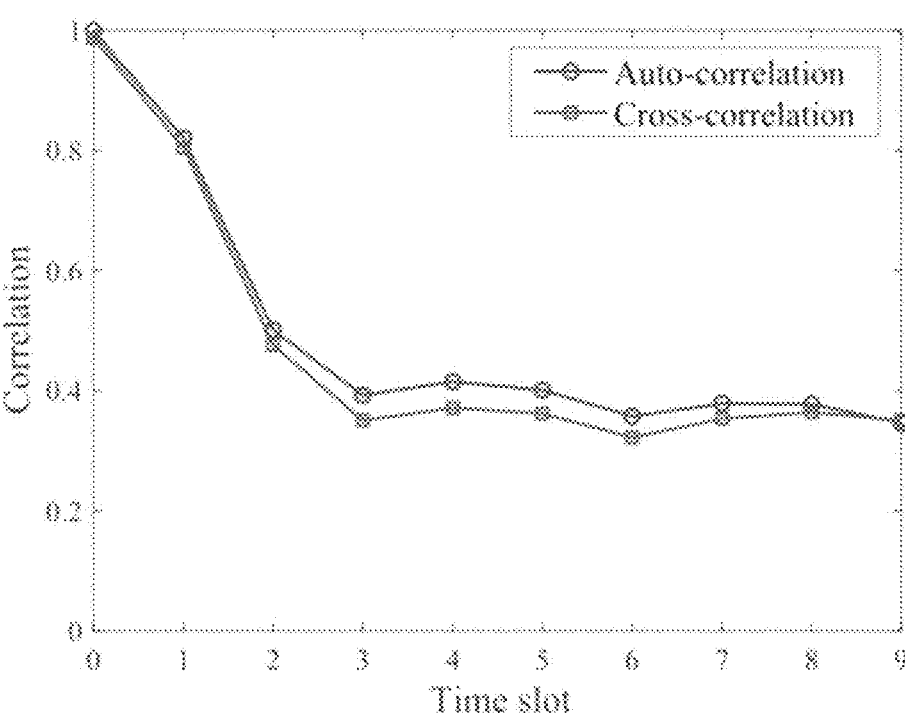
FIG. 2 is a diagram illustrating simulation results of auto-correlation and cross-correlation, according to embodiments of the present disclosure.

FIG. 2 is a diagram illustrating simulation results of auto-correlation and cross-correlation according to embodiments of the present disclosure.

Referring to FIG. 2, when the channel model is set to the SCM, it may be seen that the trends of the waveforms of the auto-correlation and the cross-correlation according to time slots are similar to each other. That is, it may be confirmed that the sub-channels through which the pilot signal is transmitted have a high correlation with each other. Accordingly, in embodiments to be described later, channel values for all sub-channels may not be used for training, but only some of them may be used (e.g., a reduced number of channel values corresponding to a subset of the sub-channels may be used for training).

Hereinafter, embodiments related to the above-described pilot signal received by the base station, a channel value estimated based thereon, and an AI-based channel prediction technique will be described.

Figure 3:
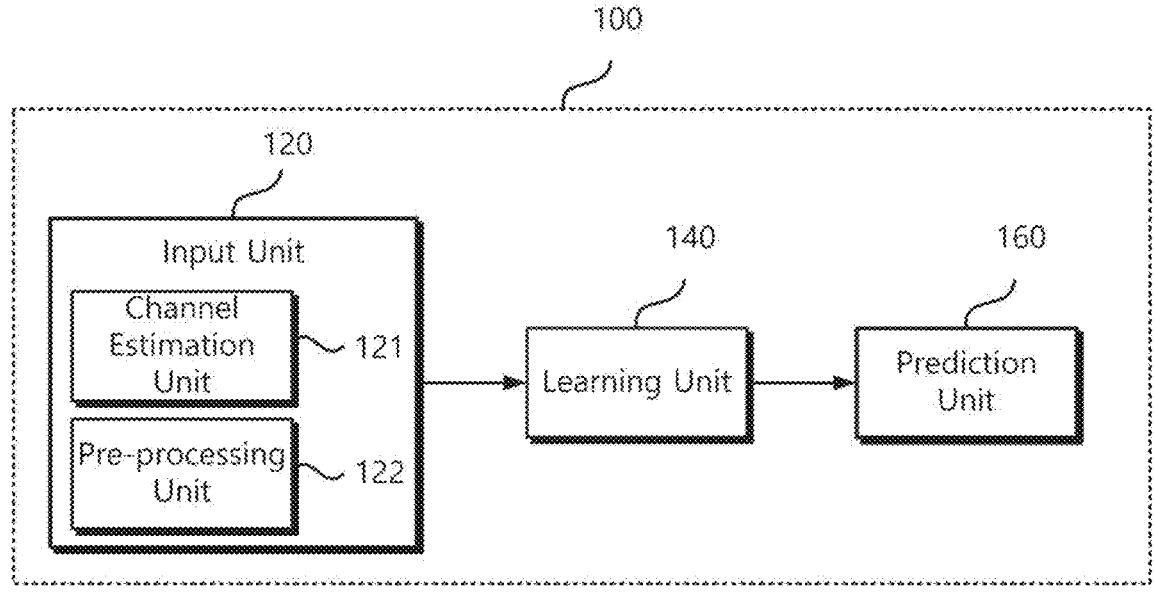
FIG. 3 is a diagram illustrating an electronic device, according to embodiments of the present disclosure.

FIG. 3 is a diagram illustrating an electronic device according to embodiments of the present disclosure.

In the present disclosure, an electronic device 100 may be included in a configuration for performing channel estimation and channel prediction among the base station and the user equipment, and for convenience, a case in which the electronic device 100 is included in (or implemented by) the base station will be described.

Referring to FIG. 3, the electronic device 100 for performing the channel prediction technique may include an input unit 120, a learning unit 140, and/or a prediction unit 160.

The input unit 120 may acquire training data, for use in learning to perform channel prediction, from a pilot signal transmitted by the user equipment. The input unit 120 may include a channel estimation unit 121 and/or a pre-processing unit 122.

The channel estimation unit 121 may perform channel estimation from (e.g., based on) the pilot signal and acquire a channel value. The channel estimation unit 121 may estimate a channel value 'g' defined for each RB based on a pilot signal, and an uplink signal including the pilot signal, that are transmitted on a plurality of RBs through multiple antennas (e.g., transmitted via multiple antennas of the user equipment and received via multiple antennas of the base station). For example, the channel estimation unit 121 may perform channel estimation based on Equations 2 to 4. Training data may be obtained based on the estimated channel value. The training data may be data used for learning (may also be referred to as training) of a channel prediction model, and may include features and/or labels.

The pre-processing unit 122 may obtain input data of the channel prediction model by dividing the features among the estimated channel values into a real part and an imaginary part. The pre-processing unit 122 may additionally perform a data processing operation according to embodiments as described later.

The learning unit 140 may train the channel prediction model based on the acquired training data. The learning unit 140 may input the input data to the channel prediction model, obtain output data from the channel prediction model, and train the channel prediction model to achieve an objective function defined by the training data and the output data.

The prediction unit 160 may obtain a channel prediction value for a prediction time based on the learned channel prediction model. According to embodiments, the prediction time may be a time subsequent to times corresponding to the training data (e.g., subsequent to the n+1$^{th}$ time slot). The prediction unit 160 may input the training data obtained at a time before the prediction time to the learned channel prediction model, and obtain a channel prediction value corresponding to the prediction time from the output data of the channel prediction model.

Figure 4:
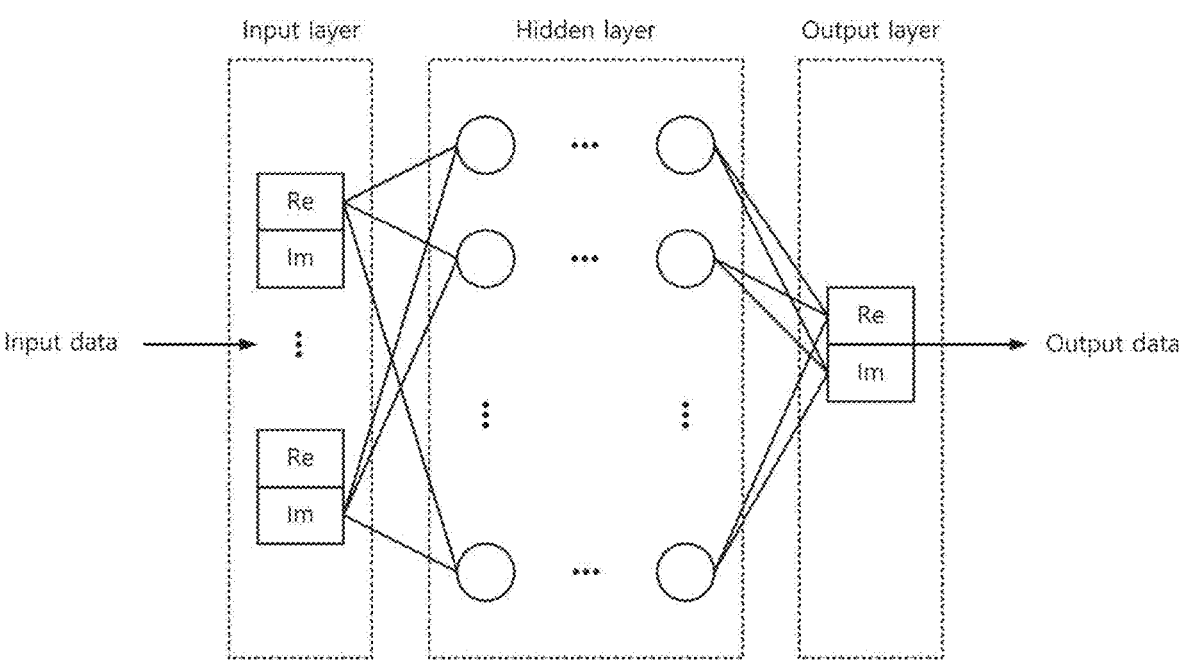
FIG. 4 is a diagram illustrating a channel prediction model, according to embodiments of the present disclosure.

FIG. 4 is a diagram illustrating a channel prediction model, according to embodiments of the present disclosure.

Referring to FIG. 4, a channel prediction model may be based on, for example, a Multi-Layer Perceptron (MLP). The MLP may be configured to predict a channel at a prediction time for channel prediction, based on channel values estimated at a future time, that is, past and current slots before the prediction time. According to embodiments, channel prediction model, implemented using the MLP, may be configured to predict a channel at the (future) prediction time based on channel values estimated in association with past and current slots before the prediction time.

The learning unit 140 may train the channel prediction model to achieve the objective function. The objective function may be defined as a function that minimizes (or reduces) the error between the label, that is, the channel value estimated in the n+1th slot, and the output data of the channel prediction model.

As illustrated, the channel prediction model may include an input layer, a hidden layer, and an output layer.

The input data, in which features are divided into a real part and an imaginary part by the above-described pre-processing unit 122, may be input to the input layer. The hidden layer may include a plurality of nodes, and the plurality of nodes may be connected to at least one other node and may be defined by an activation function and a weight, as is known. The output layer may output a channel prediction value that is output data with respect to the input data. The output layer may output a channel prediction value by combining data output to the real part and the imaginary part, respectively.

An adaptive moment estimation (ADAM) may be used (e.g., as an optimizer of the channel prediction model), and as a loss function for achieving the objective function, for example, a mean square error (MSE) technique between a channel prediction value and a label may be used.

Hereinafter, various approaches related to the electronic device 100 will be described. While discussed in the context of different approaches, embodiments are not limited thereto. According to embodiments, operations performed in the context of one of the approaches may be performed in the context of other approaches (e.g., the different approaches may be combined and implemented together). Approach 1

According to a first approach, the electronic device 100 may train a channel prediction model based on the estimated channel value 'g', and may obtain a channel prediction value from the learned channel prediction model. In this case, the estimated channel value 'g' is defined for each RB as described above.

According to a first approach, the training data obtained by the input unit 120 may be obtained based on the channel value 'g'. Accordingly, the training data may be directly obtained by the channel estimation unit 121. In this case, the feature may be $\mathbf{g}_{n-n_0+1}^{\ell}$ , . . . , $\mathbf{g}_n^{\ell}$ }, which is the channel value estimated in the plurality of slots, and the label may be $\mathbf{g}_{n+1}^{\ell}$ , which is the channel value estimated in the n+1th slot. The channel values for the slots below the nth slot, the nth slot and the n+1th slot correspond to the channel values of the past, the present time and the future time, respectively, from the perspective of the channel prediction model for classification into features and labels for learning the channel prediction model, but the channel values are all training data corresponding to channel values estimated through the channel estimation unit 121. The plurality of slots corresponding to the past and current slots corresponding to the feature may include n−n$_0$+1th slot to nth slot. Here, n$_0$ denotes the number of slots as an input order.

According to embodiments, the input order (e.g., n$_0$) may be set based on the moving speed of a user equipment that transmits the uplink signal including the pilot signal.

The above-described training data are described in reference to the nth slot. The number of pieces of the training data to be input to the channel prediction model may be a plurality of pieces of training data as many as T$_{train}$ (where, T$_{train}$ is a preset or alternatively, given value). The training data may include, for example, training data having a channel value estimated in slots before or after the n+1th slot as a label, in addition to the training data having a channel value estimated in the n+1th slot as a label. As described above, each training data may include no features and one label. According to embodiments, a T$_{train}$ may be a duration in a time dimension based on n$_0$.

As described above, the pre-processing unit 122 may divide the feature into a real part and an imaginary part, and specifically may divides $\mathbf{g}_{n-n_0+1}^{\ell}$ , . . . , $\mathbf{g}_n^{\ell}$ }, which is a feature among the estimated channel values, into a real part and an imaginary part to obtain {Re$\mathbf{g}_{n-n_0+1}^{\ell}$ ), Im( $\mathbf{g}_{n-n_0+1}^{\ell}$ ), . . . , Re( $\mathbf{g}_n^{\ell}$ ), Im( $\mathbf{g}_n^{\ell}$ )}, which is the input data of the channel prediction model.

The learning unit 140 and the prediction unit 160 may perform learning and channel prediction of the channel prediction model based on the training data including the feature $\mathbf{g}_{n-n_0+1}^{\ell}$ , . . . , $\mathbf{g}_n^{\ell}$ } and the label $\mathbf{g}_{n+1}^{\ell}$ .

An objective function to be achieved by the channel prediction model, according to embodiments, through learning based on the training data may be expressed by Equation 8.

$$\text{minimize } \| \mathbf{g}_{n+1}^{\ell} - \hat{\mathbf{h}}_{n+1}^{\ell} \|^F \qquad \text{[Equation 8]}$$

Here, $\mathbf{g}_{n+1}^{\ell}$ is the label as described above, $\hat{\mathbf{h}}_{n+1}^{\ell}$ $\in \mathbb{C}^{M \times 1}$ represents the output data that is the result value of the channel prediction model, that is, the channel value predicted as the channel value at the time of prediction through the channel prediction model, and $f(\cdot)$ represents the channel prediction function. That is, the channel prediction model may be trained in a direction in which an error between the channel value estimated in the n+1th slot and the output data of the channel prediction model is minimized (or reduced).

The input data of the input layer of the channel prediction model, according to embodiments, are defined as $\mathbf{g}_{n+1}^{\ell}$ $\in \mathbb{C}^{M \times 1}$, and since the real part and the imaginary part are divided data, the input data has a dimension of $2n_0 M$, and the output data has a dimension of $2M$.

The electronic device 100, according to embodiments, may use only training data for one sub-channel as training data when learning a channel prediction model (e.g., without training the channel prediction model using training data of other sub-channels). For example, when the pilot signal is transmitted on one sub-channel included in each of L RBs, the number of sub-channels will also be 'L'. In this case, the feature $\{ \mathbf{g}_{n-n_0+1}^{\ell}, \ldots, \mathbf{g}_{n}^{\ell} \}$ and the label $\mathbf{g}_{n+1}^{\ell}$ may mean a channel value estimated for the lth sub-channel, which is one of the 'L' sub-channels.

According to embodiments, the channel estimation unit 121 may select a lth sub-channel that is one of the 'L' sub-channels, and obtain only a channel estimation value for the lth sub-channel to configure training data.

Alternatively, according to embodiments, even if all channel estimation values for the 'L' sub-channels are obtained by the channel estimation unit 121, only the channel estimation values for the lth sub-channel may be selected by the pre-processing unit 122, so that the training data may be configured.

The learning unit 140 may train the channel prediction model using only the channel value estimated for the lth sub-channel. When the channel prediction model is trained using the channel values for all L sub-channels, the channel prediction model should be configured for each sub-channel, and accordingly learning is performed for each channel prediction model, so that a learning load occurs in which learning is repeated L times. In contrast, according to embodiments, when the channel prediction model is trained based on the channel value estimated for one lth sub-channel, the learning load may be reduced from 'L' times to once. In addition, since the auto-correlation and the cross-correlation exist between the sub-channels according to Equations 6 and 7 and FIG. 2 as described above, even if a channel value for one sub-channel is used, prediction performance similar to that of using channel values for all L sub-channels may be obtained.

Figure 5:
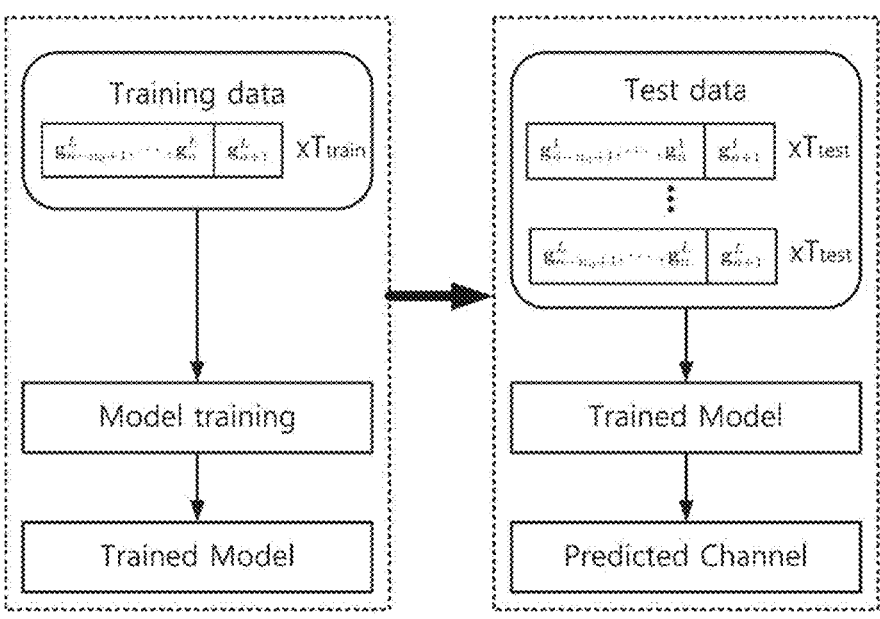
FIG. 5 is a diagram for describing an operation of a learning unit and a prediction unit corresponding to a first approach, according to embodiments of the present disclosure.

FIG. 5 is a diagram for describing an operation of a learning unit and a prediction unit, according to embodiments of the present disclosure.

Referring to FIG. 5, acquisition of a channel prediction value based on a channel prediction model, according to embodiments, may include a learning operation and a test operation.

In the learning operation, the learning unit 140 may train the channel prediction model by inputting $T_{train}$ training data to the channel prediction model. In the learning process of the channel prediction model, the channel prediction model may be trained in such a way in which the error between the channel prediction value and the label is minimized or reduced. A channel prediction model learned through learning, that is, a channel predictor (e.g., the trained channel prediction model) is generated. In this case, the learning unit 140 may generate only one channel predictor by using only the channel value estimated for the lth sub-channel as training data as described above.

In the test operation, the prediction unit 160 may obtain a channel prediction value at a prediction time by inputting test data into the learned channel prediction model. In this case, the test data may have a size of the number of $T_{test}$ having a size equal to or greater than $T_{train}$. It may be understood that the test operation may be performed to verify performance of the channel prediction model.

When the test operation is ended, the prediction unit 160 may input the channel values for the $n-n_0+2$ to n+1th slots as features to predict slots after n+1th, and then may obtain a channel prediction value for the slots after the n+1th, that is, a prediction time.

FIG. 6 is a flowchart illustrating a channel prediction method, according to embodiments of the present disclosure.

Referring to FIG. 6, in operation S110, the electronic device 100 may acquire the training data, which are defined by one RB of a plurality of RBs, have a channel value for the n+1th slot as a label, and have a plurality of channel values for an nth slot and a plurality of slots before the nth as features. Although the training data are described from the perspective of the RB, it may be understood that the training data are defined for one sub-channel in the same way (or a similar way) from the perspective of the sub-channel.

In operation S120, the electronic device 100 may train a channel prediction model based on the acquired training data. As described above, the electronic device 100 may train the channel prediction model until the channel prediction model satisfies the objective function of Equation 8.

In operation S130, the electronic device 100 may obtain a channel prediction value for a prediction time based on the learned channel prediction model. The prediction time may correspond to, for example, a slot after the n+1th slot.

According to the above-described first approach of the present disclosure, a channel prediction model may be trained based on the estimated channel value, and a channel prediction value for a future time may be obtained through the learned channel prediction model. In this case, the learning load may be reduced by using only the channel value for one sub-channel as the training data input in the learning operation, without using channel values for a plurality of sub-channels through which the pilot signal are transmitted.

Approach 2

According to a second approach, the electronic device 100 may train a channel prediction model based on the estimated channel value 'g', and obtain a channel prediction value from the learned channel prediction model, but may adjust a dimension of the training data differently from the first approach.

In the first approach, since only the channel value for the lth sub-channel is used for the training data, for example, when $T_{train}$ training data are used, the time dimension will be $T_{train}$, and the frequency dimension will be '1' corresponding to one sub-channel. Therefore, in the case of the first approach, a time overhead according to the time dimension $T_{train}$ is involved.

Accordingly, the electronic device 100, according to embodiments, may reduce a time dimension of training data defined as a channel value estimated for $T_{train}$ in the lth sub-channel and may increase a frequency dimension, to reduce the time overhead during learning.

The pre-processing unit 122 may reduce the time dimension of the channel value 'g' estimated with respect to Ttrain to T'train, which is the time dimension for L RBs. Here, T'train has a size less than or equal to Ttrain. Channel values with reduced dimension T'train may be configured as training data.

The learning unit 140 may train the L channel prediction models based on the training data having reduced dimension. For example, when $T_{train}=1000$ and L=50, and when channel values for one sub-channel among 50 sub-channels are used according to the first approach, a time overhead occurs 1000 times during learning. In contrast, when the time dimension is reduced to $T'_{train}=20$ and the frequency dimension is readjusted to 50 sub-channels instead, the time overhead may be reduced. According to embodiments, the reduced time dimension $T'_{train}$ may be $T_{train}/L$.

Figure 7:
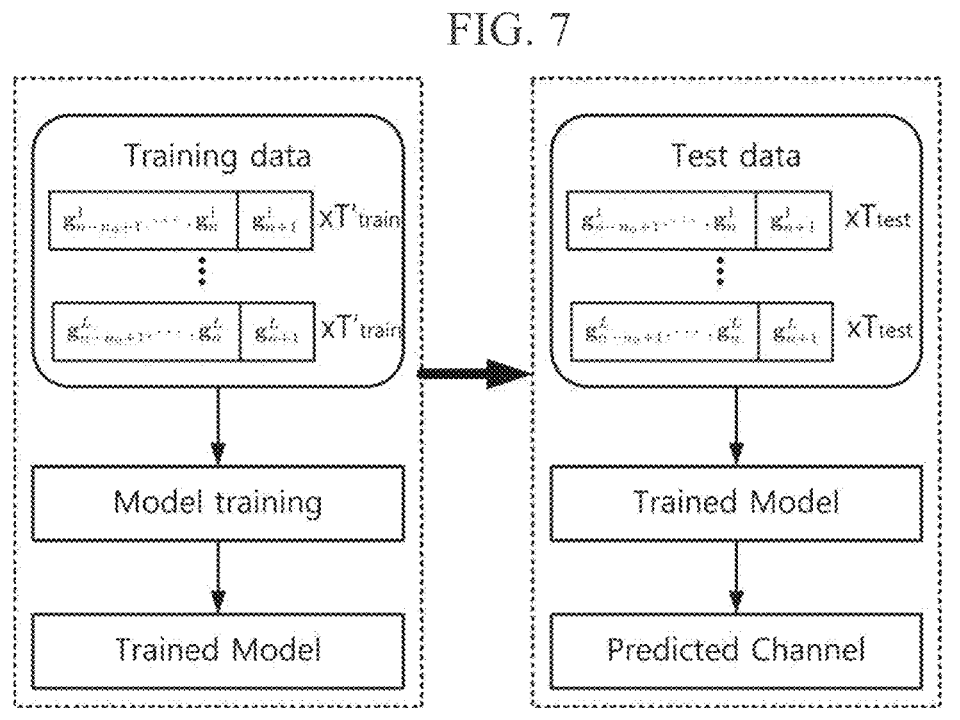

FIG. 7 is a diagram for describing an operation of a learning unit and a prediction unit, according to embodiments of the present disclosure.

Referring to FIG. 7, acquisition of a channel prediction value based on a channel prediction model, according to embodiments, includes a learning operation and a test operation.

In the learning operation, the learning unit 140 trains the channel prediction model by inputting $T'_{train}$ training data having a reduced time dimension to the channel prediction model. In the learning process of the channel prediction model, the channel prediction model may be trained in such a way in which the error between the channel prediction value and the label is minimized (or reduced). Through training, a learned channel prediction model, that is, a channel predictor (e.g., the trained channel prediction model) is generated. In this case, the learning unit 140 may perform learning on all of the L sub-channels, but one channel predictor is generated. Nevertheless, since the time dimension of the training data is reduced, the time overhead may be reduced.

In the test operation, the prediction unit 160 may obtain a channel prediction value at a prediction time by inputting test data into the learned channel prediction model. In this case, the test data may have a size of the number of $T_{test}$ having a size equal to or greater than $T'_{train}$.

When the test operation is ended, the prediction unit 160 may input the channel values for the $n-n_0+2$ to $n+1$th slots as features to predict slots after $n+1$th, and then may obtain a channel prediction value for the slots after the $n+1$th, that is, a prediction time.

Figure 8:
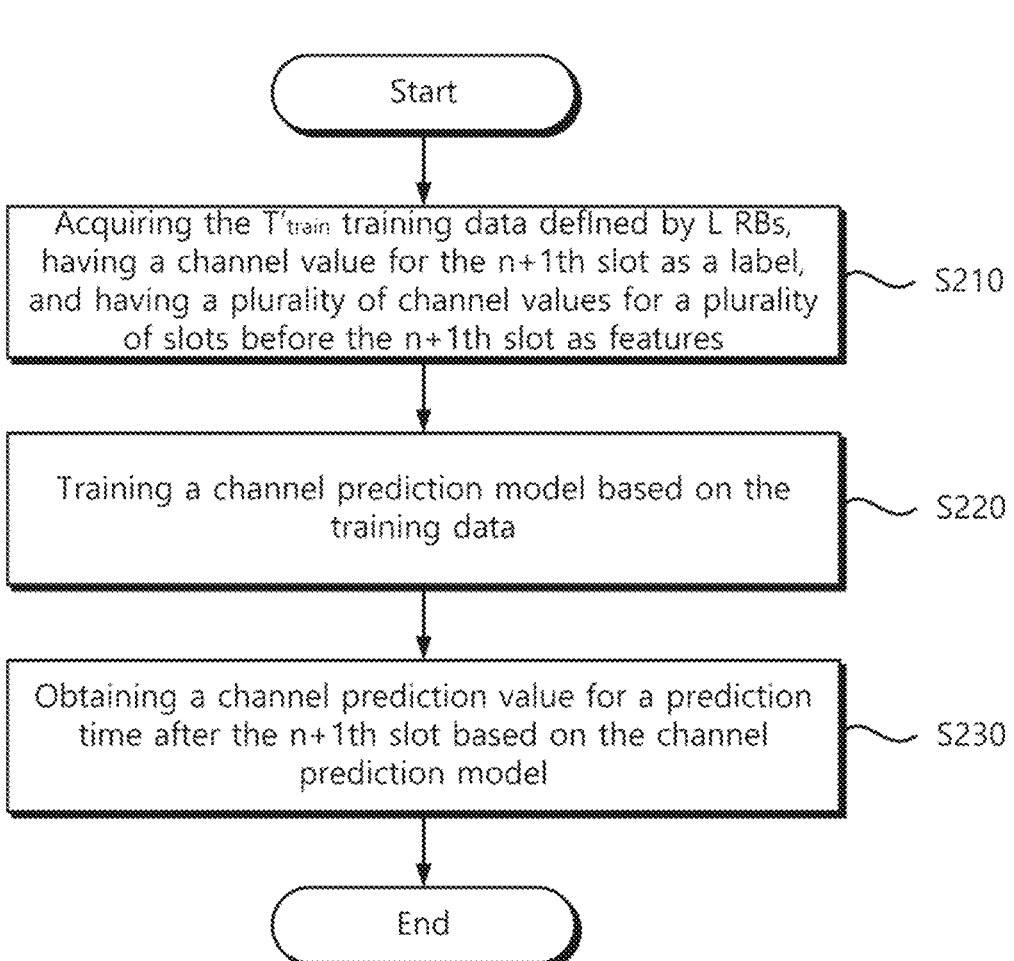
FIG. 8 is a flowchart illustrating a channel prediction method corresponding to the second approach, according to embodiments of the present disclosure.

FIG. 8 is a flowchart illustrating a channel prediction method, according to embodiments of the present disclosure.

Referring to FIG. 8, in operation S210, the electronic device 100 may acquire $T'_{train}$ training data defined for each of L RBs. As described above, the training data may have a channel value for the $n+1$th slot as the label, and may have a plurality of channel values for the nth slot and a plurality of slots before the nth as features. As described above, the electronic device 100 may acquire $T'_{train}$ training data by reducing the time dimension of $T_{train}$ training data to $T'_{train}$ and increasing the frequency dimension to 'L'.

In operation S220, the electronic device 100 may train a channel prediction model based on the acquired training data. As described above, the electronic device 100 may train the channel prediction model until the channel prediction model satisfies the objective function of Equation 8. Learning may be performed on each of the training data defined for each the L RBs. Accordingly, a channel predictor, which is a learned channel prediction model, may be generated.

In operation S230, the electronic device 100 may obtain a channel prediction value for a prediction time based on the learned channel prediction model. The prediction time may correspond to, for example, a slot after the $n+1$th slot.

According to the above-described second approach of the present disclosure, a channel prediction model may be trained based on the estimated channel value, and a channel prediction value for a future time may be obtained through the learned channel prediction model. In this case, it is possible to reduce the time overhead during learning by re-adjusting the time dimension and frequency dimension of the training data input during the learning operation.

Approach 3

According to a third approach, the electronic device 100 may train a channel prediction model based on the channel value 'q' instead of the estimated channel value 'g', and may obtain a channel prediction value from the learned channel prediction model. Here, the estimated channel value 'q' is defined for each of multiple antennas.

The electronic device 100 may perform an additional pre-processing operation to obtain the channel value 'q'.

The pre-processing unit 122, according to embodiments, may generate a matrix G of Equation 5 having $$g_n^\ell$$

obtained through the channel estimation unit 121 as a column vector.

Thereafter, the pre-processing unit 122 may obtain a row vector $$\begin{bmatrix} q_n^1 \\ \vdots \\ q_n^M \end{bmatrix}$$

of the matrix G based on Equation 9.

$$G_n = \begin{bmatrix} g_n^{1,1} & \cdots & g_n^{L,1} \\ \vdots & \ddots & \vdots \\ g_n^{1,M} & \cdots & g_n^{L,M} \end{bmatrix} = \begin{bmatrix} q_n^1 \\ \vdots \\ q_n^M \end{bmatrix} \qquad \text{[Equation 9]}$$

In the row vector $q_n^\alpha$, the $\alpha$th row vector may be defined as $$q_n^\alpha.$$

For convenience, $$q_n^\alpha$$

may also be referred to as the above described channel value 'q'. In this case, the channel value 'q' for the $n-n_0+1$th slot to the nth slot of a plurality of slots corresponding to the past and present slots is $$q^{\alpha}_{n-n_0+1}, \cdots, q^{\alpha}_n.$$

and the channel value 'q' for the n+1th slot may be defined as $$q^{\alpha}_{n+1}.$$

Therefore, training data may be acquired, which are defined for each of multiple antennas by the input unit 120, have a channel value $$q^{\alpha}_{n+1}$$

for the n+1th slot as a label, and have a plurality of channel values $$q^{\alpha}_{n-n_a+1}, \cdots, q^{\alpha}_n$$

for the nth slot and a plurality of slots before the nth as features.

Unlike the channel value 'g', which has a dimension of M×1, the channel value 'q' corresponds to a row vector of the matrix G, and thus has a dimension of 1×L. In addition, the channel value 'q' is provided as much as the number M of multiple antennas. Accordingly, M channel prediction models may also be provided. According to embodiments, the learning unit 140 may train a separate channel prediction model for each antenna among the M multiple antennas. According to embodiments, the learning unit 140 may train only one channel prediction model for all of the M multiple antennas.

The pre-processing unit 122 may reduce the time dimension of the channel value 'q' estimated with respect to $T_{train}$ to $T'_{train}$. Here, $T'_{train}$ has a size less than or equal to $T_{train}$. Channel values with reduced dimension $T'_{train}$ may be configured as training data. According to embodiments, the reduced time dimension $T'_{train}$ may be $T_{train}/L$.

The learning unit 140 may train one channel prediction model based on the training data defined by the channel value 'q' obtained from the channel value 'g'. As in the second approach, $T'_{train}$ training data having a reduced time dimension may be used. However, in the case of the third approach, 'q' is used as a channel value included in features and labels. Although the channel values are changed, channel values for the M multiple antennas, L sub-channels, and $T'_{train}$ training data having a reduced time dimension are used in the same way as, or a similar way to, the second approach, so the used channel information is the same (or similar), but channel prediction deterioration of the second approach may be compensated.

Figure 9:
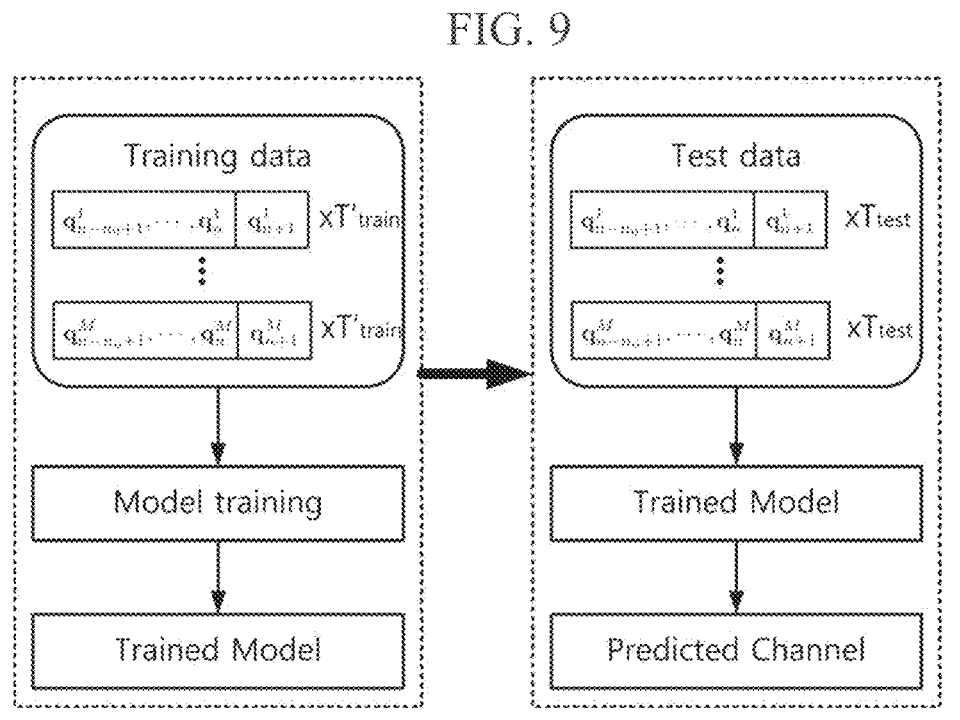

FIG. 9 is a diagram for describing an operation of a learning unit and a prediction unit, according to embodiments of the present disclosure.

Referring to FIG. 9, acquisition of a channel prediction value based on a channel prediction model, according to embodiments, includes a learning operation and a test operation.

In the learning operation, the learning unit 140 may train the channel prediction model(s) by inputting $T_{train}$ training data defined by the channel value 'q' to the channel prediction model. In the learning process of the channel prediction model, the channel prediction model may be trained in such a way in which the error between the channel prediction value and the label is minimized (or reduced). Through training, a finally learned channel prediction model, that is, a channel predictor (e.g., the trained channel prediction model) is generated. In this case, since the learning unit 140 performs learning on all the channel values 'q' defined for each M multiple antennas, one channel predictor may be generated, according to embodiments.

In the test operation, the prediction unit 160 may obtain a channel prediction value at a prediction time by inputting test data into the learned channel prediction model(s). In this case, the test data may have a size of the number of $T_{test}$ having a size equal to or greater than $T'_{train}$.

When the test operation is ended, the prediction unit 160 may input the channel values for the $n-n_0+2$ to n+1th slots as features to predict slots after n+1th, and then may obtain a channel prediction value for the slots after the n+1th, that is, a prediction time. In this case, the channel prediction value is a channel value at a prediction time defined for each of the multiple antennas.

Figure 10:
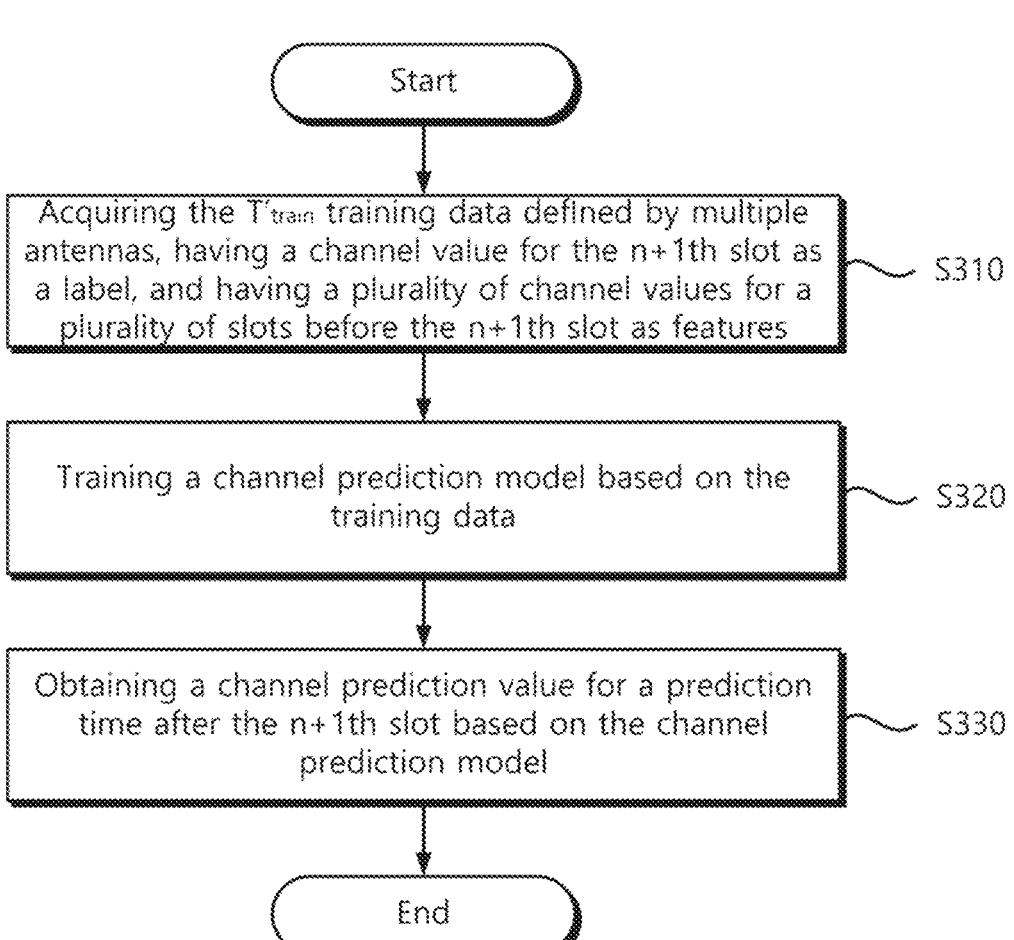
FIG. 10 is a flowchart illustrating a channel prediction method corresponding to the third approach, according to embodiments of the present disclosure.

FIG. 10 is a flowchart illustrating a channel prediction method, according to embodiments of the present disclosure.

Referring to FIG. 10, in operation S310, the electronic device 100 may acquire $T'_{train}$ training data defined for each of M multiple antennas. As described above, the training data may have a channel value $$q^{\alpha}_{n+1}$$

for the n+1th slot as a label, and may have a plurality of channel values $$q^{\alpha}_{n-n_a+1}, \cdots, q^{\alpha}_n$$

for the nth slot and a plurality of slots before the nth as features.

The electronic device 100 may estimate a channel value 'g' defined for each RB, and obtain a label and features from a row vector of the matrix G having the channel value 'g' as a column vector. Also, as described above, the electronic device 100 may acquire $T'_{train}$ training data by reducing the time dimension of $T_{train}$ training data to $T'_{train}$.

In operation S320, the electronic device 100 may train a channel prediction model based on the acquired training data. As described above, the electronic device 100 may train the channel prediction model until the channel prediction model satisfies the objective function. Here, the objective function may be a function in which the channel value 'g' is newly defined as the channel value 'q' in the objective function of Equation 8. Learning may be performed on training data defined for each of the M multiple antennas. Accordingly, a channel predictor, which is a learned channel prediction model, may be generated.

In operation S330, the electronic device 100 may obtain a channel prediction value for a prediction time based on the learned channel prediction model. The prediction time may correspond to, for example, a slot after the n+1th slot.

According to the third approach of the present disclosure described above, a channel prediction model may be trained based on a newly acquired channel value 'q' from the estimated channel value 'g', and a channel prediction value for a future time may be obtained through the learned channel prediction model. In this case, the channel prediction performance may be improved by compensating for performance degradation that occurs when the channel value 'g' is used while reducing the time dimension of the training data input during the learning operation.

Above, embodiments for channel prediction have been described. Hereinafter, application examples to which embodiments of the present disclosure described above may be applied will be described. Detailed description of overlapping parts may be omitted to avoid redundancy.

Application Example

Figure 11:
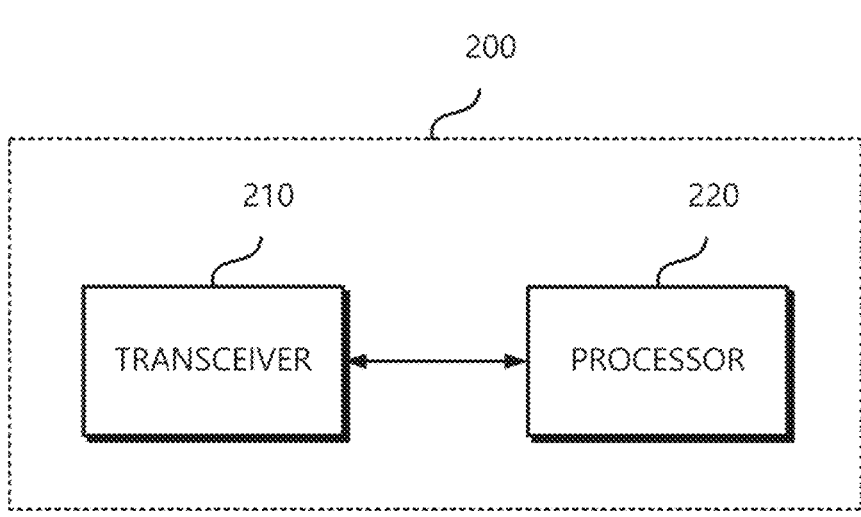
FIG. 11 is a diagram illustrating an electronic device, according to embodiments of the present disclosure.

FIG. 11 illustrates a base station according to embodiments of the present disclosure.

Referring to FIG. 11, a base station 200 includes a transceiver 210 and a processor 220. The processor 220 may correspond to the above-described electronic device 100.

The transceiver 210 may be connected to various wireless communication systems supporting MIMO, which is a multiple antennas technology, such as a long-term evolution (LTE) system, a long-term evolution-advanced (LTE-A) system, an LTE-A pro system, or a 5G system proposed by the 3GPP. The transceiver 210 may transmit and receive signals to and from a user equipment or another base station 200. Here, the signals may include control information and data, and the data may include the aforementioned pilot signal. To this end, the transceiver 210 may include a radio frequency (RF) transmitter for up-converting and amplifying the frequency of a transmitted signal, and an RF receiver for low-noise amplifying a received signal and down-converting the frequency of the signal.

The transceiver 210, according to embodiments, may receive an uplink signal including a pilot signal on a plurality of RBs, which is transmitted (and/or received) through multiple antennas.

The transceiver 210 may receive a signal through a wireless channel, output it to the processor 220, and may transmit a signal output from the processor 220 through the wireless channel.

The processor 220 may include at least one processor, may control the transceiver 210, and may be configured to implement the descriptions, functions, procedures, proposals, methods, and/or operational flowcharts of the present disclosure. For example, the processor 220 may receive a signal through the transceiver 210 and store information included in the signal, or data, in a memory (e.g., a memory included in the base station 200). In addition, the processor 220 may generate a signal by processing information stored in the memory, and then transmit the generated signal through the transceiver 210. The processor 220 may execute some or all of the processes controlled by the processor 220, according to embodiments of the present disclosure, based on the memory in which the software code is stored, which includes instructions for performing description, function, procedure, proposal, method, and/or operation flowchart in the present disclosure.

According to embodiments, the processor 220 may receive an uplink signal including a pilot signal on a plurality of RBs, transmitted (and/or received) through multiple antennas, via the transceiver 210. The processor 220 may acquire training data defined for one RB among the plurality of RBs, which have a channel value for an n+1th slot as a label, and have a plurality of channel values for the nth slot and a plurality of slots before the nth as features. Here, the channel value may be the above-described 'g'. The processor 220 may train a channel prediction model based on $T_{train}$ training data, and obtain a channel prediction value for a prediction time based on the channel prediction model.

According to embodiments, the processor 220 may receive an uplink signal including a pilot signal, on a plurality of RBs transmitted (and/or received) through the multiple antennas, via the transceiver 210. The processor 220 may acquire training data defined for each of a plurality of RBs, which have a channel value for the n+1th slot as a label, and have a plurality of channel values for the nth slot and a plurality of slots before the nth as features. Here, the channel value may be the above-described 'g'. The processor 220 may train a channel prediction model based on training data of $T'_{train}$ of the time dimension reduced from $T_{train}$, and acquire a channel prediction value for a prediction time based on the channel prediction model.

According to embodiments, the processor 220 may receive an uplink signal including a pilot signal on a plurality of RBs, transmitted (and/or received) through the multiple antennas, through the transceiver 210. The processor 220 acquires training data defined for each of multiple antennas, which have a channel value for the n+1th slot as a label, and have a plurality of channel values for the nth slot and a plurality of slots before the nth as features. Here, the channel value may be the above-described 'q'. The processor 220 may train a channel prediction model(s) based on the training data, and obtain a channel prediction value for a prediction time based on the channel prediction model(s).

Figure 12:
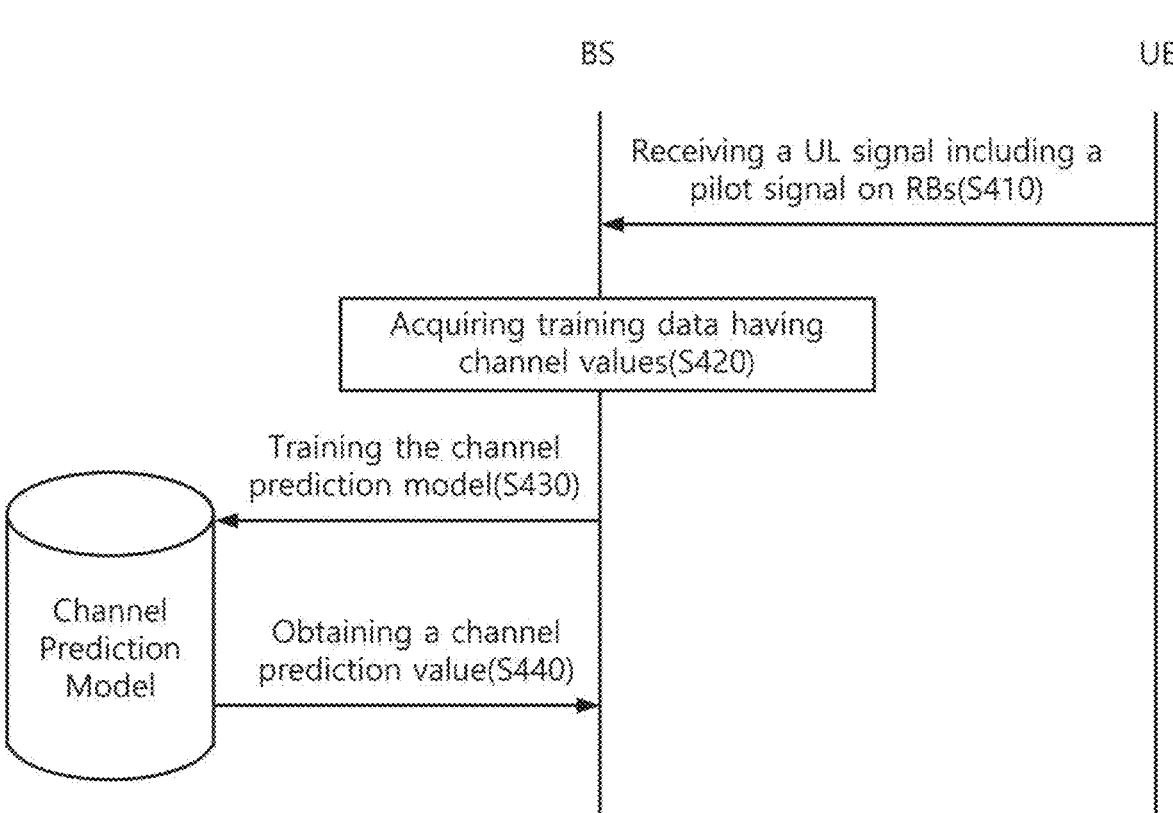
FIG. 12 is a diagram for describing an operation method of a base station 200, according to embodiments of the present disclosure.

FIG. 12 is a diagram for describing an operation method of a base station, according to embodiments of the present disclosure.

Referring to FIG. 12, in operation S410, the base station 200 may receive an uplink signal including a pilot signal on a plurality of RBs, transmitted through multiple antennas, via the transceiver 210.

In operation S420, the base station 200 may acquire training data defined by multiple antennas, having a channel value for the n+1th slot as a label, and having a plurality of channel values for the nth slot and a plurality of slots before the nth as features. In embodiments, the channel value may be 'g' or 'q'. In embodiments, the number of pieces of training data may be $T_{train}$ or $T'_{train}$ reduced in the time dimension.

In operation S430, the base station 200 may train the channel prediction model based on the training data. In embodiments, the number of channel prediction models is one.

In operation S440, the base station 200 may obtain a channel prediction value for a prediction time after the n+1th slot based on the channel prediction model(s). According to embodiments, the base station 200 may generate and transmit a downlink communication signal based on the channel prediction value. For example, the base station 200 may update one or more communication parameters (e.g., a beamforming parameter such as signal strength, phase, etc.) based on the channel prediction value and transmit the downlink communication signal according to the updated one or more communication parameters. According to embodiments, the base station 200 may receive an uplink communication signal based on the channel prediction value. For example, the base station 200 may update a process (e.g., a parameter, algorithm, etc.) for receiving, demodulating, decoding, etc., the uplink communication signal based on the channel prediction value.

According to embodiments of the present disclosure, an electronic device for predicting a channel in a MIMO communication system capable of accurately predicting a channel with less overhead, and a method for predicting the channel may be provided.

AI is being developed for channel prediction to address the challenge of inaccurate CSI resulting from feedback delay to UE movement. This inaccurate CSI leads to a reduction in transmission rate of a corresponding communication system. Conventional devices and methods for using AI for channel prediction use excessive overhead (e.g., delay, resource consumption, etc.) for model training.

However, according to embodiments, improved devices and methods are provide for channel prediction. For example, the improved devices and methods may include acquiring (e.g., generating) training data, including estimated channel values, that is limited to only one sub-channel across a plurality of time slots, and/or includes all of the sub-channels with a reduced number of time slots (e.g., reduced in a time dimension). Such a reduction in training data reduces training overhead (e.g., delay, resource consumption, etc.) for training the channel prediction model. Accordingly, the improved devices and methods overcome the deficiencies of the conventional devices and methods to at least train a channel prediction model using reduced overhead, and thus, improving the transmission rate of the corresponding communication system.

Also, according to embodiments, the improved devices and methods may include acquiring (e.g., generating) training data further including estimated channel values with respect to each of multiple antennas through which a pilot signal is received. Accordingly, the improved devices and methods may train a channel prediction model to better compensate for performance degradation while using reduced overhead.

According to embodiments, the channel prediction model(s) may have any structure that is trainable, e.g., with training data. For example, the channel prediction model(s) may include an artificial neural network, a decision tree, a support vector machine, a Bayesian network, a genetic algorithm, and/or the like. The channel prediction model(s) will now be described by mainly referring to an artificial neural network, but embodiments are not limited thereto. Non-limiting examples of the artificial neural network may include a convolution neural network (CNN), a region based convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, and/or the like.

According to embodiments, operations described herein as being performed by the electronic device 100, the input unit 120, the learning unit 140, the prediction unit 160, the channel estimation unit 121, the pre-processing unit 122, the base station 200 and/or the processor 220 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In embodiments, the processing circuitry may perform some operations (e.g., the operations described herein as being performed by the channel prediction model(s)) by artificial intelligence and/or machine learning. As an example, the processing circuitry may implement an artificial neural network (e.g., the channel prediction model(s)) that is trained on a set of training data by, for example, a supervised, unsupervised, and/or reinforcement learning model, and wherein the processing circuitry may process a feature vector to provide output based upon the training. Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory of the base station 200). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

The above descriptions are specific examples for carrying out the present disclosure. Embodiments in which a design is changed simply, or which are easily changed, may be included in the present disclosure as well as the examples described above. In addition, technologies that are easily changed and implemented by using the above examples may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
processing circuitry configured to,
    acquire training data corresponding to multiple antennas, the training data having a label and features, the label including a first channel value for a first time slot, and the features including a plurality of second channel values for a plurality of time slots before the first time slot;
    train a channel prediction model based on the training data to obtain a trained channel prediction model; and
    obtain a channel prediction value for a prediction time based on the trained channel prediction model,
    wherein the processing circuitry is configured to:
      estimate a respective channel value for each of a plurality of resource blocks (RBs) based on an uplink signal, the uplink signal including a pilot signal, and the pilot signal being received on the plurality of RBs through the multiple antennas; and
      acquire the label and the features from a row vector of a matrix, a column vector of the matrix having the respective channel value for each of the plurality of RBs.

2. The electronic device of claim 1, wherein
the respective channel value for each of the plurality of RBs has a dimension of M×1, M being a number of the multiple antennas; and
the label and each of the features has a dimension of 1×L, L being a number of the plurality of RBs.

3. The electronic device of claim 1, wherein the processing circuitry is configured to train the channel prediction model to minimize an error between a result value of the channel prediction model and the label.

4. The electronic device of claim 1, wherein the channel prediction model is based on a Multi-Layer Perceptron (MLP).

5. The electronic device of claim 1, wherein a number of the plurality of time slots is set based on a moving speed of a user equipment that transmits the uplink signal.

6. The electronic device of claim 1, wherein the channel prediction model includes only one model.

7. The electronic device of claim 1, wherein
the first channel value for the first time slot is $$q_{n+1}^{\alpha};$$

and
the plurality of second channel values are $$q_{n-n_0+1}^{\alpha}, \cdots, q_n^{\alpha},$$

α being a value from 1 to M, M being a number of the multiple antennas, and n being a natural number.

8. The electronic device of claim 1, wherein the processing circuitry is configured to reduce a time dimension of the training data.

9. A method of predicting a channel, the method comprising:
    acquiring training data corresponding to multiple antennas, the training data having a label and features, the label including a first channel value for a first time slot, and the features including a plurality of second channel values for a plurality of time slots before the first time slot;
    training a channel prediction model based on the training data to obtain a trained channel prediction model; and
    obtaining a channel prediction value for a prediction time based on the trained channel prediction model,
    wherein the acquiring of the training data comprises:
      estimating a respective channel value defined for each of a plurality of resource blocks (RBs) based on an uplink signal, the uplink signal including a pilot signal, and the pilot signal being received on the plurality of RBs through the multiple antennas; and
      acquiring the label and the features from a row vector of a matrix, a column vector of the matrix having the respective channel value for each of the plurality of RBs.

10. The method of claim 9, wherein
the respective channel value for each of the plurality of RBs has a dimension of M×1, M being a number of the multiple antennas; and
the label and each of the features has a dimension of 1×L, L being a number of the plurality of RBs.

11. The method of claim 9, wherein the training of the channel prediction model includes training the channel prediction model to minimize an error between a result value of the channel prediction model and the label.

12. The method of claim 9, wherein a number of the plurality of time slots is set based on a moving speed of a user equipment that transmits the uplink signal.

13. The method of claim 9, wherein the channel prediction model includes only one model.

14. The method of claim 9, wherein
the first channel value for the first time slot is $$q_{n+1}^{\alpha};$$

and
the plurality of second channel values are $$q_{n-n_0+1}^{\alpha}, \cdots, q_n^{\alpha},$$

α being a value from 1 to M, M being a number of the multiple antennas, and n being a natural number.

15. The method of claim 9, further comprising:
reducing a time dimension of the training data.

16. A base station comprising:
    a transceiver configured to receive an uplink signal via multiple antennas, the uplink signal including a pilot signal on a plurality of resource blocks (RBs); and
    processing circuitry connected to the transceiver, the processing circuitry being configured to,
      acquire training data corresponding to the multiple antennas, the training data having a label and features, the label including a first channel value for a first time slot, and the features including a plurality of second channel values for a plurality of time slots before the first time slot, train a channel prediction model based on the training data to obtain a trained channel prediction model, and obtain a channel prediction value for a prediction time based on the trained channel prediction model, wherein the processing circuitry is configured to:

estimate a respective channel value for each of the plurality of RBs based on the uplink signal; and acquire the label and the features from a row vector of a matrix, a column vector of the matrix having the respective channel value for each of the plurality of RBs.

17. The base station of claim 16, wherein the respective channel value for each of the plurality of RBs has a dimension of M×1, M being a number of the multiple antennas; and the label and each of the features has a dimension of 1×L, L being a number of the plurality of RBs.

\* \* \* \* \*